Figure 1:
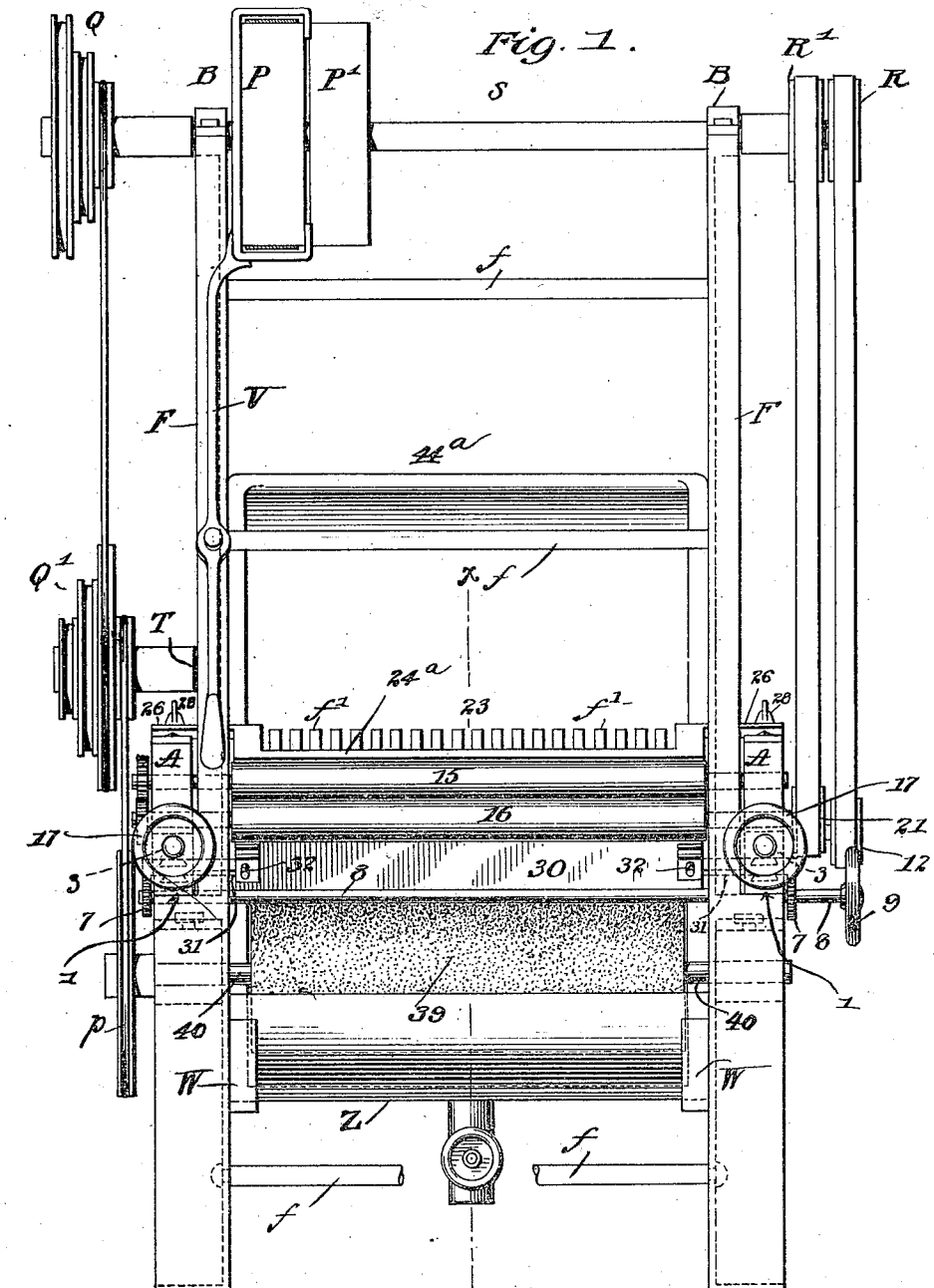

No. 651,159. Patented June 5, 1900.
A. BLOCH & W. REUTER.
MACHINE FOR CARROTING FURS.
(Application filed Feb. 8. 1900.)
(No Model.) 3 Sheets—Sheet 1.

WITNESSES: INVENTORS
Frank S. Ober Adolph Bloch, Wm Reuter
Chas E Peters BY Willton Le Doux
ATTORNEY No. 651,159. Patented June 5, 1900.
A. BLOCH & W. REUTER.
MACHINE FOR CARROTING FURS.
(Application filed Feb. 8, 1900.)
(No Model.) 3 Sheets—Sheet 3.

WITNESSES:

INVENTORS
Adolph Bloch, Wm Reuter
BY
ATTORNEY

UNITED STATES PATENT OFFICE.

ADOLPH BLOCH AND WILLIAM REUTER, OF NEW YORK, N. Y.

MACHINE FOR CARROTING FURS.

SPECIFICATION forming part of Letters Patent No. 651,159, dated June 5, 1900.

Application filed February 8, 1900. Serial No. 4,459. (No model.)

*To all whom it may concern:*

Be it known that we, ADOLPH BLOCH, residing in New York, borough of Manhattan, in the county of New York, and WILLIAM REUTER, residing in New York, borough of Brooklyn, in the county of Kings, State of New York, both subjects of the German Emperor, have invented certain new and useful Improvements in Machines for Carroting Furs; and we do hereby declare the following to be a full, clear, and exact description of the invention, such as will enable others skilled in the art to which it appertains to make and use the same.

Our invention relates to the treatment and preparation of furs used in the manufacture of the felt out of which hats are made to increase the felting properties of the fur.

Previous to removing the fur from the skin it is prepared for felting by rubbing into it a solution of nitrate of mercury. This is termed "carroting the fur," and the solution used is known as the "carroting" liquid or acid. In order that the fur may be properly prepared, the solution must be rubbed in thoroughly, so that every filament will receive the proper quantity. Heretofore the only practical and efficient method of rubbing in the solution has been by hand-brushes; but the operation is slow, tedious, and uneven, and the liquid being a mercurial acid is injurious to the hands of the workmen, and the position they are compelled to occupy directly over the skin they are operating upon exposes them to the fumes, which are deleterious to health. Attempts have been made to substitute mechanical rubbing for hand-rubbing, and a number of machines have been produced with that end in view; but they have not proved successful in practice.

To this end our invention consists in a machine for carroting fur, in which are combined a rotary rubbing-brush, a rotary feed or supply brush, the former rotating at a much higher speed than the latter, the rotary supply-brush taking up the acid and transferring it to the rubbing-brush evenly and in sufficient quantities, but without spraying the acid and throwing it about to the injury of the attendants and machinery and wasting of the material; and it further consists in a pressure-regulator for pressing the fur toward the rubbing-brush that automatically adjusts the pressure to the length of the fur, so that the bristles will penetrate the fur the entire length of the filaments, and a pressure-regulator, constructed with openings to allow the sprayed acid free exit from under the regulator, and thus prevent any quantity of acid from getting on the pelts.

It further consists in a trough constructed and arranged so that the contents are clearly visible from the front of the machine and which is provided with an extension that forms a guard at the back of the machine that intercepts the acid sprayed by the rubbing-brush and returns it to the trough.

It further consists in a fixed brush placed at the rear of the rubbing-brush to take off the excess of acid when the feeding of the skin is interrupted and to remove the filaments of fur that stick to the rubbing-brush.

It further consists in certain other devices and contrivances for adjusting the several parts of the machine which will be fully described hereinafter and specifically pointed out in the claims.

Figure 2:
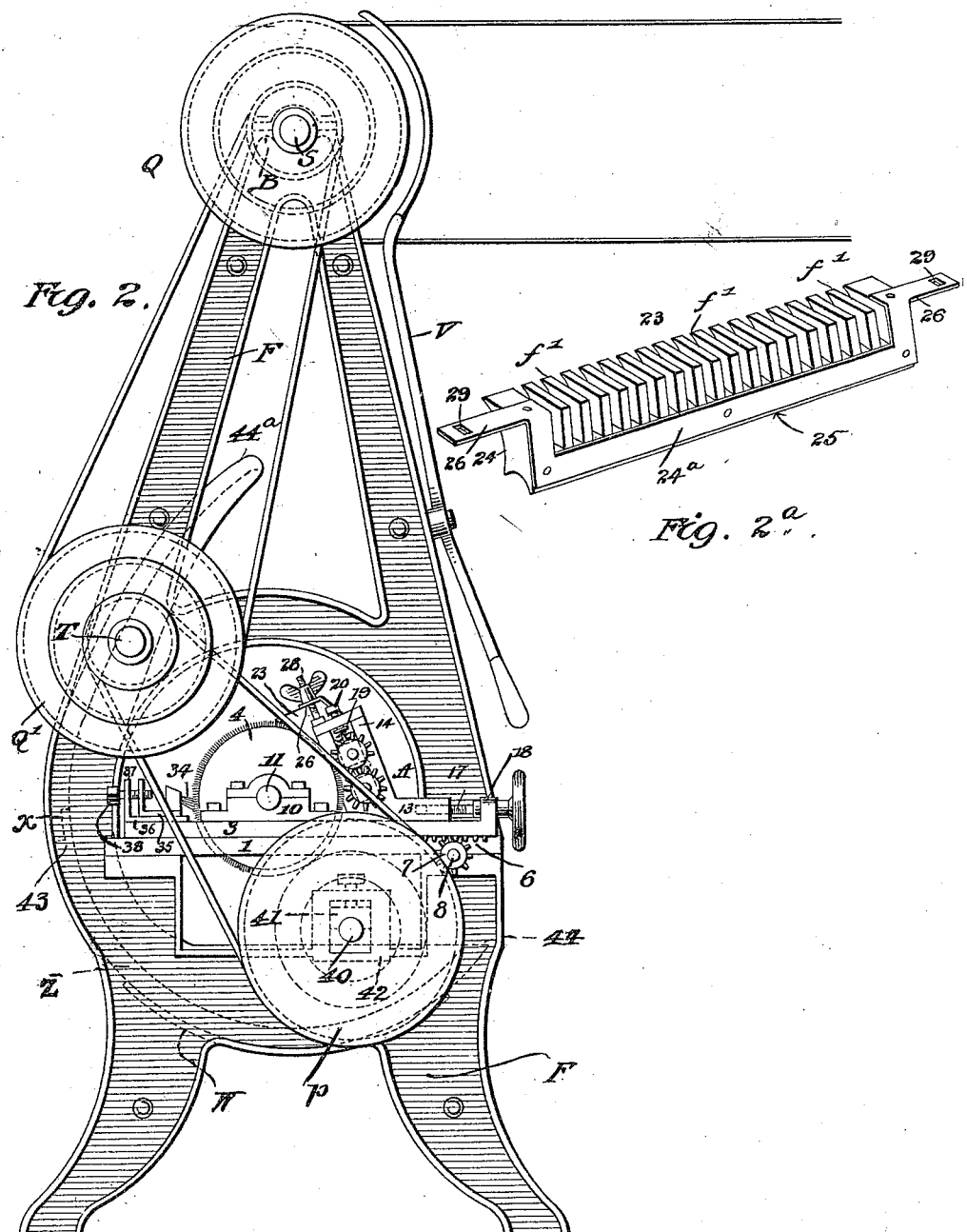
Figure 3:
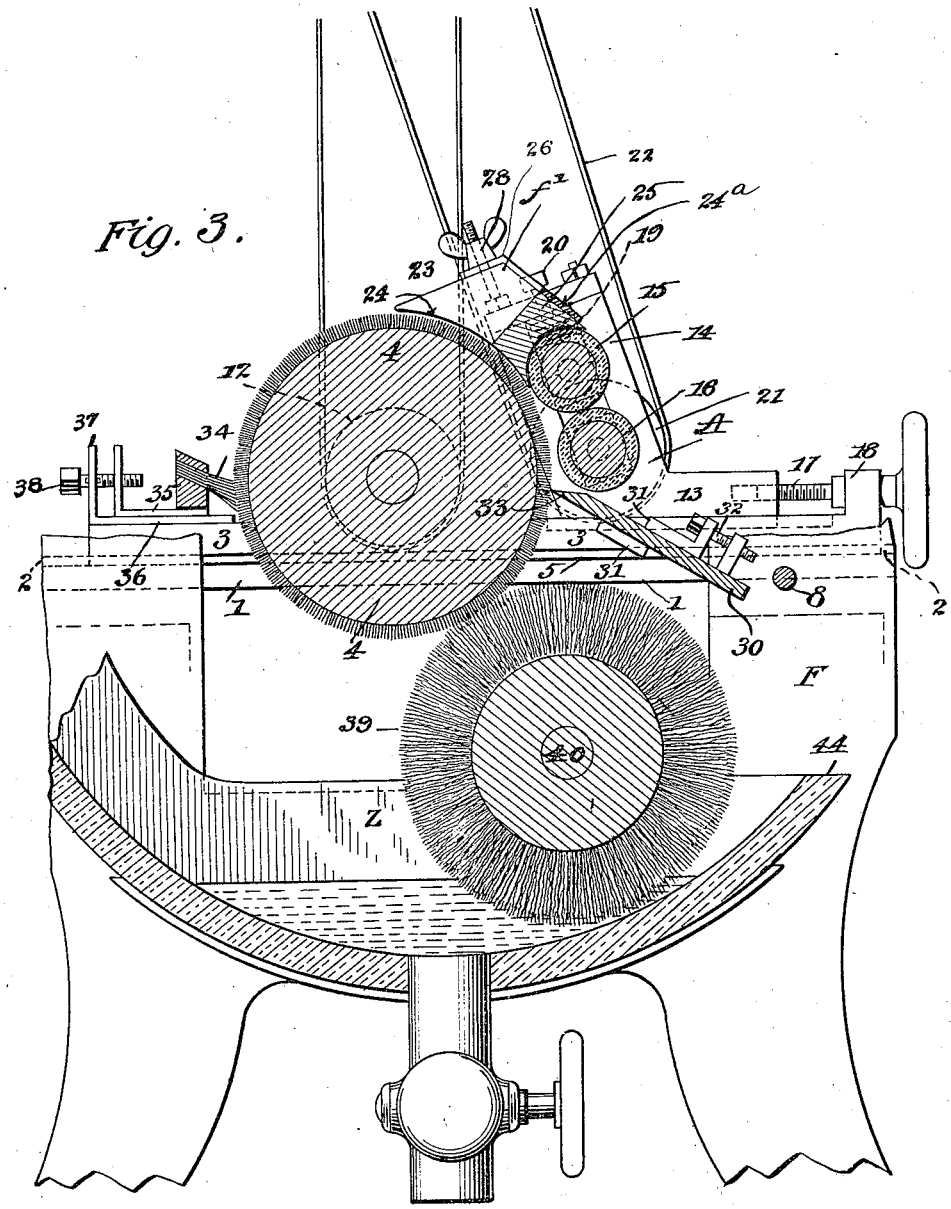

In the accompanying drawings, Figure 1 represents a front elevation of our improved carotting-machine; Fig. 2, a side elevation of the same; Fig. 2ᵃ, a perspective view of the pressure-regulator detached from the machine; Fig. 3, a transverse vertical section, much enlarged taken on line X X of Fig. 1.

Referring to the drawings, F F are the side members of the frame of the machine, each being cast in a single piece preferably and having shaft-bearings B B at the top, in which is hung a driving-shaft S, that carries between the frames fast and loose pulleys P P' and at one end a grooved pulley Q and at the other end two belt-pulleys R R', and in the side frames next to the grooved pulleys Q a stud T is fixed, on which is mounted a grooved pulley Q'. Power is transmitted to the machine by a belt running over pulley P, which may be shifted to the pulley P' by the belt-shifter V. On the inside of the frames F F semicircular ribs W W are cast to form supports for the acid-trough Z, hereinafter more particularly described. The side frames are connected together by means of the transverse rods *f f*. The side frames are provided with horizontal brackets I I, having longitudinal grooves 2 therein, on which are supported the slides 3 3, that form a carriage that carries the rubbing-brush 4 and devices that coöperate with it and which will be more fully described presently. These sliding plates have splines 5 on their under sides that fit into the grooves 2, and thus guide them and prevent lateral displacement. 6 6 are toothed racks on the slides, near the front ends thereof, which are engaged by toothed wheels 7 7 on a lateral shaft 8 at the front of the machine, having a hand-wheel 9 at one end thereof. By means of the hand-wheel shaft the carriage can be moved back and forth for a purpose that will be described hereinafter.

On the slides 3 3, at a point somewhat nearer the rear than the front ends thereof, are pillow-blocks 10 10, having bearings therein in which the transverse shaft 11 is carried. On the shaft between the side frames is mounted the rotary rubbing-brush 4. A pulley 12 is mounted on the right-hand end of the shaft 11 in line with the pulley R the two pulleys being connected together by a belt, the gearing being such that the speed of the rubbing-roller will be about two hundred and fifty revolutions per minute.

On the slides 3 of the carriage is a sliding frame A, having horizontal side members 13 13, that are connected with the slides by means of splines and grooves, so that they will slide freely back and forth, and inclined upright members 14 14, that serve as housings for the feed-rolls 15 16. The front ends of the side members 13 13 are connected with the hand-screws 17 17, held in the uprights 18 18, forming parts of the slides 3 3. By means of these hand-screws the frame is moved back and forth.

The feed-rolls 15 16 are made of rubber or other suitable material not affected by the carroting fluid. The shaft of the lower feed-roll 16 is held in fixed bearings in the uprights 14 14; but the shaft of the upper feed-roll 15 is held in sliding boxes, which are controlled by spiral springs 19 and adjusting-screws 20, whereby the upper feed-roll may adjust itself to the thickness of the skin passing through the rolls and sufficient pressure be maintained to feed the skin to the machine. The feed-rolls are geared together, and on the ends of the shaft of the lower roll 15 is a belt-pulley 21 in line with pulley R', and a belt 22, running over the said pulleys, communicates motion to the lower feed-roll, and by means of the gearing the two rolls are caused to rotate together. By means of the hand-screws 17 17 the feed-rolls can be moved to and from the rubbing-brush 4 to make the space between the said rolls and rubbing-brush adjustable.

Connected with the top of the uprights of the frame is an automatic pressure-regulator 23 for pressing the skins toward the rubbing-brush, so that the bristles of the brush will penetrate the fur however long the filaments may be. This pressure-regulator is of a peculiar shape and construction, its general outlines being seen in the end view of it shown in Fig. 3 of the drawings and the perspective view, Fig. 2ª, where also the construction is more particularly shown. As seen in the end view, Fig. 3, the top and rear sides of the regulator are straight surfaces at a more or less obtuse angle to one another. The under side 24 forms a curve of about the same radius as the rubbing-brush, so that when the skin is under the pressure-regulator the brush in revolving will rub against the fur at every point, and thus the bristles of the brush will penetrate to a uniform depth in the fur. The lower end of the regulator is a segment of a circle corresponding in radius to the upper feed-roller, on which the said end rests. In construction the regulator consists of a series of fingers $f'\ f'\ f'$, &c., more or less, according to the space which it may be found necessary to have between them for the purpose which it is desired to accomplish, and these fingers spring from a bar 25 and form, preferably, but not necessarily, an integral part thereof. The regulator is hung between standards or uprights 14 14 and supported in that position by the projections 26 26, forming part of a rectangular plate 24ª, connected with the bar 25, and the end fingers or plates $f'$ of the regulator, which rest on top of the standards and are held in that position by the bolts 28 28, provided with thumb-nuts passed down through the elongated slots 29 29 in said projections. A vibrating motion is allowed by the slots to the regulator, so that its concave bearing-surface 24 can be moved toward or away from the periphery of the rubbing-brush to regulate the space between through which the skin passes. This capability of adjustment is for the purpose of regulating the pressure according to the length of the fur on the skins passing through the machine, and thus causing the bristles of the brush to penetrate the fur, whatever its length may be, far enough to rub the acid along the filaments their entire length, which they will not do if the bearing-surface is set at one fixed distance from the brush.

The automatic adjustment of the regulator is brought about by the relation which the regulator has to the upper movable feed-roll 15, on which its lower end rests. By this relation when a skin passes between the feed-rolls the upper roll is moved away from the bottom roll more or less, depending upon the length of the fur on the skin, and by this motion the regulator is tilted or turned downward, so that the surface 24 will be brought nearer to the brush, and thus when the skin passes between the regulator and the brush it will be pressed downward against the brush and the bristles thereby enabled to reach into the fur. When, however, the fur is shorter, the feed-rolls will not be separated so far, and consequently the regulator will not be moved so near the brush. Thus the separation of the upper feed-roll from the lower roll to accommodate the feeding of skins with different lengths and thicknesses of fur automatically adjusts the relation of the pressure-regulator to the brush, and the exact force of the pressure necessary to cause the brush to penetrate the fur and rub in the acid the full length of the filament is regulated.

By making the bearing-surface of the pressure-regulator of a series of fingers or like a comb means are afforded for the escape of the acid sprayed upward from under the regulator instead of being squeezed downward and backward upon the pelts, and thus injuring them. When the machine is running, if for any reason the feeding of the skins is stopped or delayed for a greater or less length of time the rubbing-brush becomes charged with the acid, and when a skin is finally fed to the brush if the regulators were solid the surplus acid would be thrown off the brush and too great a quantity would be deposited upon the following pelt; but the openings between the fingers afford an escape for any acid-spray that may be thrown upward and backward by the brush when the feeding of the skins is delayed or interrupted or when the spraying is caused by the thickness or length of the fur. Any acid-spray thus driven out between the fingers of the regulator will be caught by a guard and returned to the trough, as will be described presently.

Below the feed-rolls is an adjustable guard 30, supported at its ends in an inclined position on lugs 31 in the slides of the carriage, and fitted with adjusting-screws 32, by which the position of its edge 33 with relation to the rubbing-brush may be regulated, so that it may be retained nearly in contact with the brush. The purpose of this guard is to intercept any spray occasioned by the contact of the two revolving brushes from being thrown backward or upward against the lower feed-roller.

Behind the rubbing-brush is an adjustable stationary brush 34, the lug of which is connected with a slide 35, that rests upon a plate 36, connected with the slides 3 of the carriage, that has an upward extension 37. Set-screws 38 at each end passed through the upward extension and engaging the upward extension of the slide serve to move the brush to and from the rubbing-brush. The purpose of the stationary brush is to wipe off the acid from the rubbing-brush in case of delay in feeding the skins, and also to take off any filaments of fur that may adhere to the brush.

Below and forward, more or less, than the rubbing-brush is a feeding-brush 39, made of bristles about four inches long stuck into a wooden lag or drum and which is mounted on a wooden shaft 40. This shaft extends beyond the sides of the acid-trough (hereinafter described) and its ends are supported in wooden bearings 41 in hangers 42, connected with the projections 1, connected with the sides of the frame. On the left-hand end of the said shaft is a grooved pulley $p$, in line with the grooved pulley $Q'$ on the stud T. A belt runs over these two pulleys and another belt runs from the larger grooved pulley $Q'$ on the said stud to the grooved pulley $Q$ on the shaft. The feeding-brush is intended to run at a speed of about seven revolutions per minute; but it is intended in practice to provide the machine with gearing to adapt the feeding-brush to be driven at various speeds in order that a greater or less quantity of acid may be fed to the rubbing-brush, according to the requirements of the fur.

By making the shaft of the feed-brush and its bearings of wood these parts which are directly over the acid-trough and are most exposed to the acid are made impervious to the acid, whereas if they were made of metal they would soon be destroyed.

Under the feed-brush is the acid-trough Z, which is an almost semicircular vessel made of earthenware or other material not affected by the acid. It is made in one piece preferably and its sides are low enough to permit the ends of the feed-brush shaft to extend over and beyond them to its bearings 41. The tank is supported on the ribs W W, cast on the inside of the frame, and it is placed on its supports, so that its front edge 44 is much lower than its rear edge 43 and below the level of the shaft of the feed-brush. The front of the trough is thus open, and the interior being in full view it can be seen at all times if the proper quantity of acid is in the trough. The rear side of the trough extends up to a point above the plane of the axis of the rubbing-brush, and from this point it is still further extended by means of a concave earthenware guard 44ª, that catches the acid sprayed or thrown back by the rubbing-brush and returns it to the trough. The guard is preferably made separate from the tank and it is jointed thereto at $r$. By this construction and arrangement the spray thrown back by the rubbing-brush is intercepted and the machinery and workmen are protected and loss of material avoided.

The feeding-brush, it will be observed, is driven by grooved speed-pulleys, so that the said brush can be revolved at various speeds. The object of using this form of pulley is to regulate the quantity of acid fed to the rubbing-brush by the speed at which the feeding-brush is driven, so that by shifting the belt the speed of the feeding-brush may be increased or diminished and the rubbing-brush consequently supplied with a greater or less quantity of acid, according to the demands of the work.

The rubbing-brush, it is preferred, shall be made of root fibers about one inch long, while the feeding-brush should be made of bristles about four inches long.

The feeding-brush is geared to run at a much slower speed than the rubbing-brush, as shown. While the relative speeds may be varied according to circumstances, it is suggested that the speed of the feeding-brush may be seven revolutions per minute and that of the rubbing-brush may be two hundred and fifty revolutions per minute.

The parts of the machine are arranged as follows: The rubbing-brush is adjusted so that it will be in contact with the feeding-brush, more or less, and the feed-rolls moved into position to properly feed the skins to the rubbing-brush, while the guard 30 is moved toward the rubbing-brush until its edge is in contact with the rubbing-brush, and the auxiliary brush at the rear is adjusted to bear against the rubbing-brush, these adjustments being clearly shown in Fig. 3. Thus arranged the operation of the machine is as follows: A skin with the fur side down is placed between the feed-rolls, which seize it and feed it to the rubbing-brush, which rotates from right to left and carries the forward end upward and draws the skin under the pressure regulator, which is pressed by the upper feed-roller toward the rubbing-roller, more or less, according to the length of the fur. The rubbing-brush being charged with acid fed to it by the revolving feed-brush, when the skin is drawn under the regulator the brush rubs the acid into the fur thoroughly.

If for any reason there should be delay or stoppage in feeding the skins while the machine continues running, the brush would retain too much acid; but the stationary brush at the rear wipes it off.

By providing the openings between the fingers which will permit the acid to be thrown upward behind the regulator, it is intercepted by the guard 44ª, which deflects it downward and back into the trough.

By means of the hand-wheel 9 the carriage can be moved to carry the rubbing-brush toward or away from the feed-brush for properly adjusting it or to take up wear. So, also, the feed-rolls can be adjusted by means of the hand-screw 17 to get them in the exact position to properly feed the skin to the brush.

We claim—

1. In a machine for carroting fur the combination of a feed-brush, a rubbing-brush, means for driving the latter at a higher speed than the former, an automatically-adjustable concave pressure-regulator located above the rubbing-brush to press the skin uniformly against the surface of the rubbing-brush, and feed-rolls for feeding the skin between the rubbing-brush and the pressure-regulator, substantially as specified.

2. In a machine for carroting fur the combination of a feed-brush, a rubbing-brush, means for driving the latter at a higher speed than the former, an automatically-adjustable pressure-regulator located above the rubbing-brush to press the skins uniformly against the surface of the rubbing-brush, and feed-rolls for feeding the skins between the rubbing-brush and the pressure-regulator, substantially as specified.

3. In a machine for carroting fur the combination of an acid-feeding brush, a rubbing-brush and means for adjusting the rubbing-brush relatively to the feeding-brush to take up wear and regulate the distance the bristles of the feeding-brush penetrate between the fibers of the rubbing-brush, substantially as specified.

4. In a machine for carroting fur the combination with the rubbing-brush and the feed-rolls, of a pressure-regulator and means for automatically adjusting the position of the said regulator with relation to the rubbing-brush to regulate the pressure to correspond to the length of the fur on the skin fed to the machine, substantially as specified.

5. In a carroting-machine the combination with the rubbing-brush and the feed-rolls of a pressure-regulator adapted to vibrate to and from the rubbing-brush, and having its lower end resting on the upper movable feed-roll to adapt it to be moved toward the rubbing-brush when the feed-roll is lifted to admit the skins, substantially as specified.

6. In a machine for carroting fur, the combination with the rubbing-brush and the feeding-brush of an adjustable guard at the front to intercept the acid sprayed by the contact of the brushes, substantially as specified.

7. In a machine for carroting fur the combination with the rubbing-brush, the feeding-brush and a pressure-regulator having its bearing-surface formed of a series of fingers, of a trough for the acid made of a material impervious to the acid open at front and extended upward at the rear to form a guard to intercept and return to the trough the acid sprayed or thrown backward by the rubbing-brush, substantially as specified.

8. In a machine for carroting fur, the combination with the rubbing-brush and feeding-brush of an adjustable brush to remove the surplus acid from the rubbing-brush, substantially as specified.

9. In a machine for carroting fur the combination with the feeding-brush of a rubbing-brush mounted on a carriage and means for sliding the carriage to and fro to adjust the rubbing-brush relatively to the feeding-brush, substantially as specified.

10. In a machine for carroting fur the combination with a rubbing-brush of a regulator and feed-rolls and an adjustable frame carrying said regulator and feed-rolls, substantially as specified.

In testimony that we claim the invention above set forth we affix our signatures in presence of two witnesses.

ADOLPH BLOCH.
WILLIAM REUTER.

Witnesses:
FERDINAND ROTH,
THEODOR RIEDMANN.